United States Patent
Yovanof et al.

[11] Patent Number: 5,677,689
[45] Date of Patent: Oct. 14, 1997

[54] FIXED RATE JPEG COMPLIANT STILL IMAGE COMPRESSION

[76] Inventors: Gregory S. Yovanof, 1205 Heatherstone Way, Sunnyvale, Calif. 94087; Alexander I. Drukarev, 460 Azalea Way, Los Altos, Calif. 94022

[21] Appl. No.: 521,789

[22] Filed: Aug. 31, 1995

[51] Int. Cl.$^6$ ............................................. H03M 7/30
[52] U.S. Cl. .................................... 341/50; 358/433
[58] Field of Search ....................... 241/50, 51; 358/432, 358/433; 364/725

[56] References Cited

U.S. PATENT DOCUMENTS

| | | | |
|---|---|---|---|
| 5,293,252 | 3/1994 | Kim et al. | 358/432 |
| 5,341,318 | 8/1994 | Balmanski et al. | 364/75 |

FOREIGN PATENT DOCUMENTS

| | | | |
|---|---|---|---|
| WO93/19434 | 9/1993 | WIPO | G06K 9/36 |

OTHER PUBLICATIONS

Nakagawa, et al., "DCT-Based Still Image Compression ICS with Bit-Rate Control", IEEE, 1992, pp. 711–717.

Wen-Hsiung Chen and William K. Pratt, "Scene Adaptive Coder", IEEE Transactions on Communications, vol.-Com. 32, No. 3, Mar., 1984, pp. 225–232.

Siu-Wai Wu and Allen Gersho, "Rate–Constrained Picture–Adaptive Quantization for JPEG Baseline Coders", 1993, IEEE, pp. V-389–V392.

Abbas Razavi, Rutie Adar, Isaac Shenberg, Rafi Retter, and Rami Friedlander, "VLSI Implementation of an Image Compression Algorithm with a New Bit Rate Control Capability", 1992, IEEE, pp. V–669–V–672.

Kannan Ramchandran and Martin Vetterli, "Rate–Distortion Optional Fast Thresholding with Complete JPEG/MPEG Decoder Compatibility", IEEE Transactions on Image Processing, vol. 3, No. 5, Sep., 1994, pp. 700–704.

Terminal Equipment and Protocols for Telematic Services, Information Technology—Digital Compression and Coding of Continuous–Tone Still Images–Requirements and Guidelines, ISO/TECV–10918–1; 1993(E).

*Primary Examiner*—Brian K. Young

[57] ABSTRACT

The present invention is a fully JPEG compliant two-pass approach that can compress an arbitrary image to a predetermined fixed size file. The compression coding device and method according to the present invention estimates an activity metric based on the average sum of the absolute value of the quantized DCT coefficients per block. Given the activity metric, a mathematical model relating the image activity to the JPEG Q-factor for a given value of the target compression ratio provides an estimated Q-factor value that yields the design target ratio. This mathematical model is developed during a calibration phase which is executed once off line for a given image capturing device. The fact that our activity metric is based on the quantized DCT coefficients allows for an efficient implementation of the presented coding method in either speed or memory bound systems.

6 Claims, 7 Drawing Sheets

MODEL: $Q = 0.0056 \times A^2 - 5.3014 \times A + 1243.6477$

* : HP scheme, JPEG-variable Q, Target Compr. Ratio = 15:1
o : JPEG with fixed Q = 20 (avg. Q-factor)

FIXED RATE JPEG COMPLIANT STILL IMAGE COMPRESSION

BACKGROUND OF THE INVENTION

This invention relates generally to a method and apparatus for compressing digital image data, and more particularly to a method and apparatus for compressing digital image data within a fixed-size buffer.

A number of applications employing lossy compression require that a mechanism be employed to control the size of a compressed image so that it does not exceed the capacity of a fixed-sized buffer. Controlling the size of the compressed image is required for example in digital cameras where the user expects to store a predefined number of pictures into a fixed-size buffer, or alternatively in computer peripheral systems like a laser printer where a fixed-size buffer is used to store the rendered page image. In image compression, the problem of controlling the compressed image size is generally known as the rate-control problem or the fixed-size buffer problem.

Mechanisms introduced in the past that address the fixed-sized buffer still image compression problem fall into two main classes: 1) one-pass approaches and 2) iterative approaches. One-pass approaches typically run faster than iterative approaches, however, compared to iterative approaches, one-pass approaches produce images of inferior quality. Although iterative approaches typically produce images having superior quality, this superior image quality is at the expense of added computational complexity and/or buffer requirements.

One-pass approaches estimate on-the-fly the complexity of the encoded image. Based on the estimated complexity of the encoded image, coding parameters are modified in order to achieve the target compression ratio. In general, one-pass approaches provide suboptimal designs because they allocate bits based on estimates of local image statistics. However, one-pass schemes offer the advantages of: a) improved system speed, since input data is processed only once and b) minimal buffering requirements, since only a small portion of the original image and the compressed bitstream need be stored at any point.

In contrast to single pass approaches, iterative rate-control approaches require two or more passes over a single image in order to compress it to a pre-specified compression ratio. Typically, during the first pass statistics reflecting the complexity of the input image are collected. These statistics are utilized during subsequent passes to adjust certain coding parameters allocated to various subblocks of an image in accordance with their complexity. Iterative approaches potentially can achieve optimal rate-distortion performance since they utilize global information.

Moreover, some of the currently available iterative compression methods maintain full compatibility with the JPEG (Joint Photographic Experts Group) still image compression standard. The baseline version of the JPEG algorithm (ITU-T Rec.T.81/ISO/IEC 10918-1 "Digital Compression & Coding of Digital Still Images") does not permit the modification of the coding parameters in the middle of the encoding of a single image. Hence, any JPEG compliant rate control scheme with good performance has to process an input image at least twice; one-pass to assess the complexity of the image and, one or more additional passes to perform the actual coding.

FIG. 1 shows a block diagram of a conventional JPEG compliant two-pass approach for the fixed-size buffer problem. In this two-pass approach, the original image 110 is stored in memory and passed to a JPEG processing section 112. The JPEG processing section 112 includes a Discrete Cosine Transform (DCT) section 114, a Quantizing section 116 employing a given Q-table and a given Q-factor, and a Variable Length Coding (VLC) section 118. After computation of the quantized coefficients in section 116, an activity metric reflecting the complexity of the input image may be computed in section 120. From the activity metric a new Q-factor and possibly a new Q-table are computed in section 122. The JPEG processing 112 of the original image 110 results in a compressed image 124. An inverse JPEG process 126 is performed using the initial Q-factor and Q-table from section 116 followed by a second JPEG process performed in block 128 using the newly computed Q-factor and Q-table from section 122. The inverse JPEG block 126 typically includes an inverse VLC block 130, an inverse Quantizer block 132, and an inverse DCT block 134. Although the approach in FIG. 1 provides a good image quality, it is computationally complex requiring a long run time.

A two-pass compression approach providing a fully JPEG compliant data compression system is described in the reference "VLSI Implementation Of An Image Compression Algorithm With A New Bit Rate Control Capacity," Razavi et al., ICASSP 1992, pages 669–672. In the approach described in Razavi et al., the original image goes through a JPEG compression (first pass). From the size of the JPEG compressed image a new Q-factor is computed. The original image then goes through a second JPEG compression (second pass) except this time, the JPEG compression uses the newly computed Q-factor to determine the compressed image.

An alternative two-pass compression approach is described in "DCT-Based Still Image Compression ICS With Bit-Rate Control," Nakagawa et al., IEEE Trans. Cons. Electr. 1992, pages 711–717. In the two pass approach described therein, the original image goes through a JPEG compression (first pass) where an activity metric which is based on the non-quantized DCT coefficients is computed. In the second pass, based on the activity metric, the Q-factor is adjusted. The original image then goes through a second JPEG compression (second pass) except this time, the JPEG compression uses the newly computed Q-factor to determine the compressed image.

A problem with the iterative schemes described in the Razavi et al. and Nagawa et al. references is that they require the original image to be stored in a buffer. The additional memory needed for storage is expensive and adds to system cost. Comparing the iterative approach shown in FIG. 1 to the approaches in Razavi et al. and Nagawa et al., the approaches in the Razavi et al. and Nagawa et al. references both cannot read directly from a compressed image. In some applications, e.g. CCD digital camera, the original image can only be read once (from the CCD.) Therefore the iterative approaches of Razavi et al. and Nagawa et al. require an additional buffer to store the original image before the second pass.

A fully JPEG compliant scheme is needed which does not require storage of the original image, thereby decreasing buffer requirements, minimizes computational complexity and provides excellent image quality.

SUMMARY OF THE INVENTION

The present invention is a fully JPEG compliant two-pass approach that can compress an arbitrary image to a predetermined fixed-size buffer. It achieves this by adjusting on a per image basis the value of the Q-factor used in the JPEG System. The Q-factor in the JPEG system scales up or down the quantization levels for the DCT coefficients which are stored in the Q-table. The value of the Q-factor controls the quality of the compressed image and indirectly the compression ratio. The compression coding device and method according to the present invention estimates the activity metric based on the average sum of the absolute value of the quantized DCT coefficients per block. A mathematical model relating the image activity metric to the Q-factor for a given value of a target compression ratio, provides an estimated Q-factor value $Q_{new}$ that yields a pre-specified target compression ratio. Calculating an activity metric based on the quantized DCT coefficient allows the elimination of processing steps thus reducing computational complexity.

The present invention provides two alternative embodiments, both of which eliminate computation of the inverse DCT coefficients during the second pass. Whether the first embodiment or the second embodiment is used is based on the architecture of the compression coding system. If memory size is not critical, then the first embodiment is preferred since compared to the second embodiment it reduces computational complexity. If memory is at a premium, the second embodiment reduces buffer size needed but at the cost of computational complexity.

In the first embodiment, the original image is read and compressed using a modified JPEG algorithm. Typically, the JPEG processing block includes a DCT coefficient block, a Quantizer block, and a VLC block. In the first embodiment of the code conversion system according to the present invention, the VLC coding block is eliminated during the first pass. The quantization is done using a given Q-table and a predetermined value of the Q-factor, $Q_{init}$, which remains the same for all images. After the DCT and Quantization steps, the activity metric is computed and from the activity metric a new estimated Q-factor, $Q_{new}$, is found.

During the second pass, the value of the already quantized coefficients will be adjusted using the new Q-factor $Q_{new}$ and then entropy (VLC) coded. The estimated Q-factor $Q_{new}$ is used during the partial JPEG step which occurs during the second pass. During this partial JPEG step in the second pass, the value of the quantized DCT coefficients is adjusted by dividing them with the number ($Q_{init}^{-1}*Q_{new}$). The result is processed by the VLC block resulting in a final compressed image. Thus, we save the VLC processing and the inverse DCT steps that a two-pass rate-control scheme would typically require. As a result of this, the complexity of our scheme is approximately only a 1.5 times that of the standard single-pass JPEG system without any rate-control.

In the second embodiment, the original image is compressed during the first pass with the JPEG algorithm using the predetermined Q-factor value of $Q_{init}$. By compressing the original image during the first pass, the original image can fit into a working buffer which is smaller than the original image size. Unlike the compression system according to the first embodiment, the first pass of the second embodiment includes all the processes of a standard JPEG processing block including the DCT coefficient process, a Quantizing process, and a VLC process resulting in an output of a JPEG compressed image with a Q-factor of $Q_{init}$. During the second pass, the image is processed by a partial JPEG decompressor and then a partial JPEG compressor having a coarser quantization step, corresponding to the newly estimated value of the Q-factor $Q_{new}$ provided by the mathematical model relating the activity metric to the Q-factor.

During the second pass, the compressed image is processed by an inverse VLC block which returns the quantized DCT coefficients under the original Q-table and the Q-factor $Q_{init}$. Then these coefficients are adjusted by dividing each coefficient by the value ($Q_{init}^{-1}*Q_{new}$) which results in approximately quantizing the original unquantized DCT coefficients under the original Q-table and the Q-factor $Q_{new}$. The adjusted DCT coefficients are then coded by the VLC process resulting in a final JPEG compliant compressed image.

A further understanding of the nature and advantages of the present invention may be realized with reference to the remaining portions of the specification and the attached drawings.

DETAILED DESCRIPTION OF THE PREFERRED EMBODIMENTS

Figure 1:
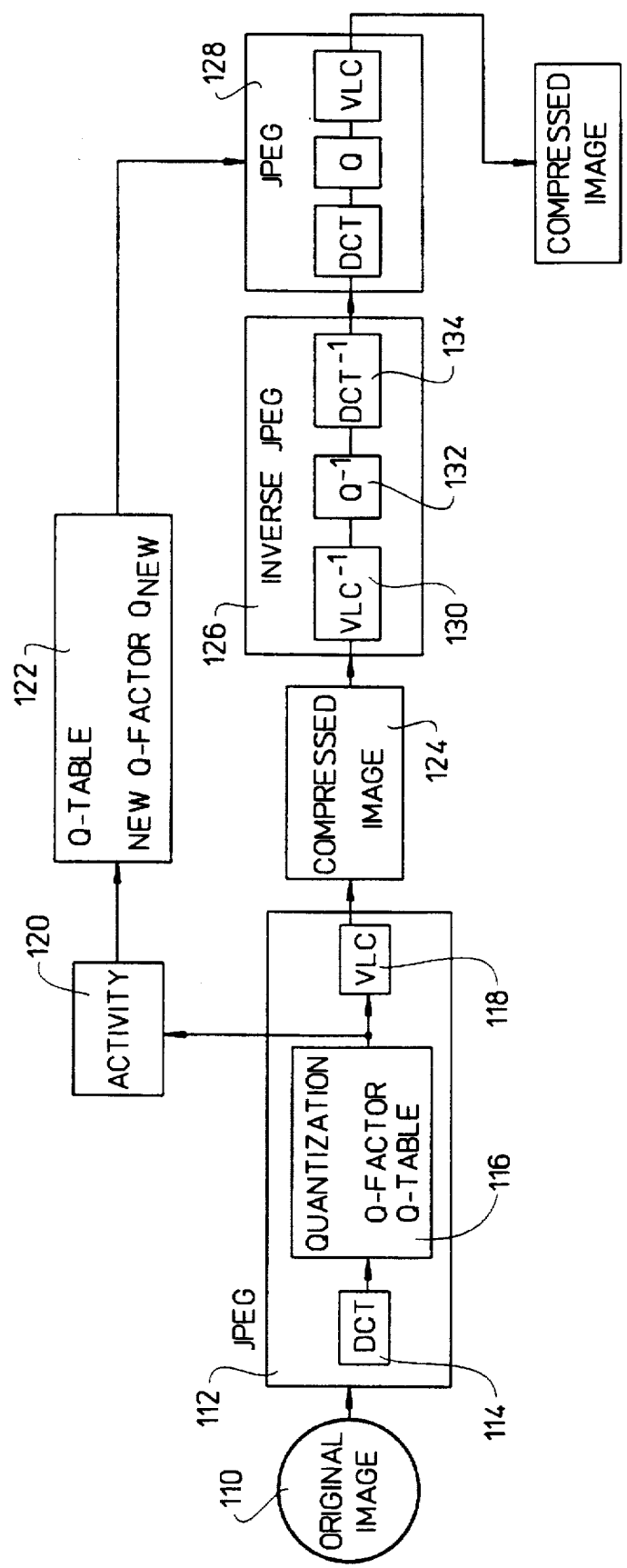
FIG. 1 is block diagram of a conventional two-pass JPEG-Compliant Coding system.

The present invention provides a method and apparatus for compressing an arbitrary electronic image represented in digital form as a block of pixels into a predetermined fixed-size buffer. The JPEG compliant compression method includes the steps of: developing a mathematical model for a particular image capturing device, where the mathematical model defines a relationship for test images between the activity meter and the Q-factor, orthogonally transforming said block of pixels into a set of transform coefficients, quantizing the transform coefficients, using a fixed quantization table Q-table whose entries are $Q_{ij}$ and a predetermined initial Q-factor, $Q_{init}$, into quantized transform coefficients, computing the activity metric from the quantized transform coefficients, using the mathematical model defining the relationship for test images between the activity metric and the Q-factor to determine the estimated Q-factor $Q_{new}$ yielding the desire target compression ratio, adjusting the value of the quantized transform coefficients using the initial Q-factor $Q_{init}$ and the estimated Q-factor $Q_{new}$, and coding the adjusted quantized transform coefficients.

The first step in transforming the block of pixels representing the electronic image into a compressed image of a fixed predetermined size is developing a mathematical model for a particular image capturing device, where the mathematical model defines a relationship for test images between the activity metric and the Q-factor. The activity metric is a measure of the complexity of the electronic image that is used for determining the compressibility of the image. We have experimentally observed that there exists a strong correlation between the activity metric of an image and the value of the Q-factor which yields a specified compression ratio. The mathematical model describing the relationship between the image activity metric and the Q-factor is derived during the calibration phase. The calibration phase needs to be done only once for a given image capturing device, before any compression of the original electronic image.

The Q-factor is a single user-selectable parameter in the JPEG system that controls the quality of the compressed image, and, indirectly the compression ratio. Specifically, it is the parameter that scales up or down the quantization levels for the DCT coefficients which are stored in a matrix known as the Q-table. The efficiency of the method depends on correctly estimating the value of the Q-factor which for a given image yields a pre-specified compression ratio. The proposed two-pass JPEG compliant rate-control scheme provides a mechanism for adjusting the value of the Q-factor in the JPEG algorithm so that an arbitrary image is compressed to a predetermined fixed size file. The compressed file can then be decoded by any JPEG compliant decoder.

The mathematical model capturing the relationship between image activity and the value of the Q-factor is derived during a calibration phase, before the actual compression. During the calibration phase we process a representative set of test images with the JPEG algorithm and calculate, the Q-factor value Q that yields the target ratio for the given image. During the calibration phase, we also calculate the activity metric A of the test images at a predetermined Q-factor value of $Q_{init}$. The value $Q_{init}$ has been found experimentally as the largest Q-factor that does not introduce any visible artifacts to the set of representative images.

Figure 2A:
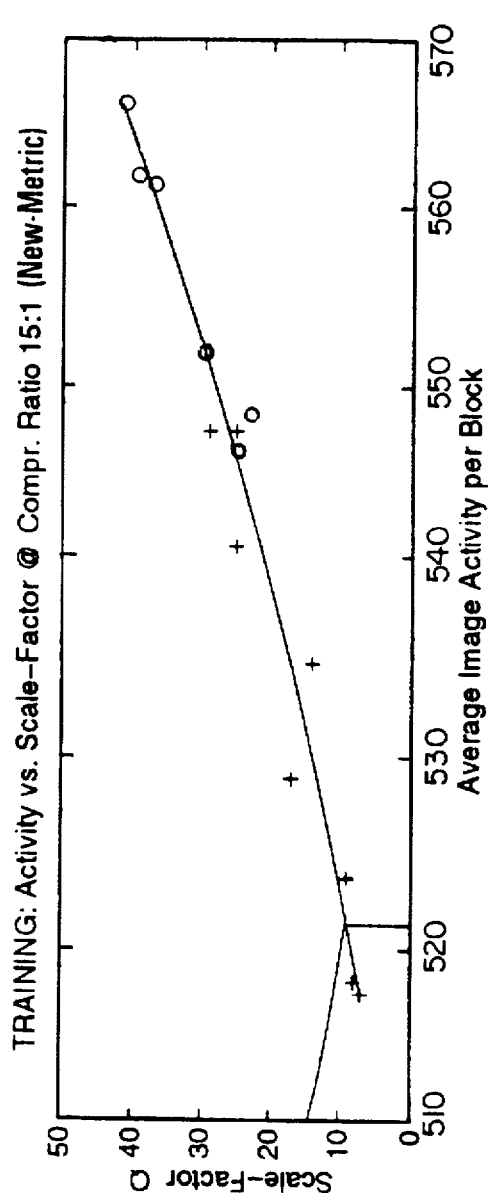
FIG. 2A shows the (Q,A) sample points obtained on a set of training images captured with a KODAK DCS200 digital camera.

FIG. 2A shows the (Q,A) sample points obtained on a set of training images captured with a KODAK DCS200 digital camera. Our training test suite contains both indoor and outdoor scenes. Next, a mathematical model which fits the (Q,A) sample points is found. We found that the pairs of (Q,A) values plotted in FIG. 2A follow a 2nd-degree polynomial function. Doing a Least-Squares fit of a second degree polynomial to the sample pairs (Q,A) we get $$Q = 0.0056 \times A^2 - 5.3014 \times A + 1243.6477 \quad \text{(Equation 1)}$$

Experimentally, we have observed that this mathematical formula for estimating the Q-factor value $Q_{new}$ given the image activity metric tends to underestimate its Q-factor in the range of small Q-factor values. Thus, in our mathematical model we have set a lower limit $Q_{min}$. In the case where the Q-factor value Q given by Equation 1 is lower than $Q_{min}$ we use $Q_{new} = Q_{min}$ instead of $Q_{new} = Q$. Thus, the particular mathematical model used in our system for estimating the new Q-factor is given by:

$$Q_{new} = \begin{cases} Q & \text{if } Q > Q_{min} \\ Q_{min} & \text{otherwise} \end{cases}$$

where $Q_{min}$ is again a predetermined value which is fixed for all images and which in our case is set equal to $Q_{init}$ and Q is the value given by Equation 1. This model is specific to the particular image capturing device used, in this case the KODAK DCS200 digital camera, and to the design target compression ratio, in this case 15:1 compression for color images.

Figure 2B:
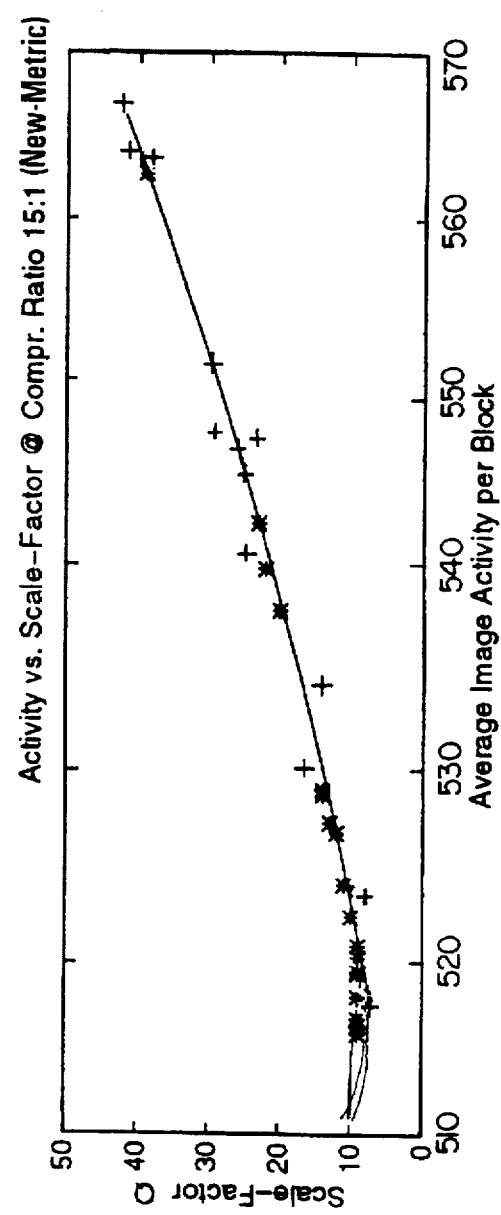
FIG. 2B shows the graph of the model second degree polynomial superimposed on a number of (Q,A) sample points corresponding to the set of training images.

FIG. 2B shows the graph of the model second degree polynomial superimposed on a number of (Q,A) sample points corresponding to the set of training images and a different set of test images. The calibration phase need only be performed once off-line for a given class of images captured by a particular image capturing device and for a given target compression ratio.

After the mathematical model capturing the Activity versus Q-factor relationship has been derived, the original image may be compressed according to the JPEG compliant method and apparatus of the present invention. The present invention provides two alternative embodiments, both embodiments 1) use the quantized DCT coefficients to calculate the activity metric and 2) eliminate the computation of the inverse DCT coefficients.

We have experimentally observed that there exists a strong correlation between the Activity metric and the value of the Q-factor which yields a specified compression ratio. Several different activity metrics can be used for estimating the activity of a given image. Although other methods of computing the activity metric are available, the method we use is given by the average sum of the absolute value of the quantized DCT coefficients per block. Specifically, the activity metric used is $$A = 1/N_B \sum_{N_B} \sum_{i=1}^{8} \sum_{j=1}^{8} \left| \frac{q_{ij}}{Q_{init} * Q_{ij}} \right|$$

(Equation 2)
where $N_B$ is the number of 8×8 blocks in the original image $Q_{init}$ is the Q-factor value used during the first pass for all images, $q_{ij}$ are the unquantized DCT coefficients, and $Q_{ij}$ is the (i,j)th entry in the Q-Table.

Figure 3A:
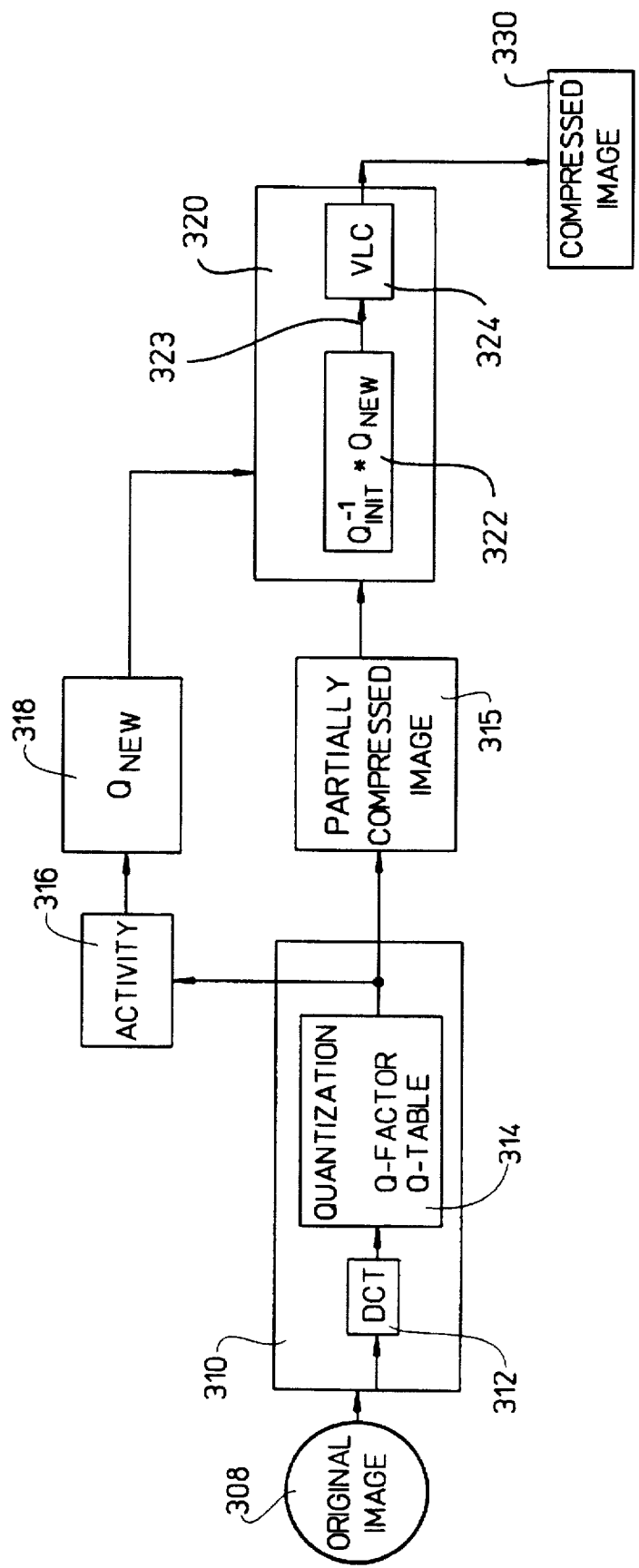
FIG. 3A is a block diagram of a two-pass JPEG Compliant Fixed-Rate Coding system according to a first embodiment of the present invention.
Figure 3B:
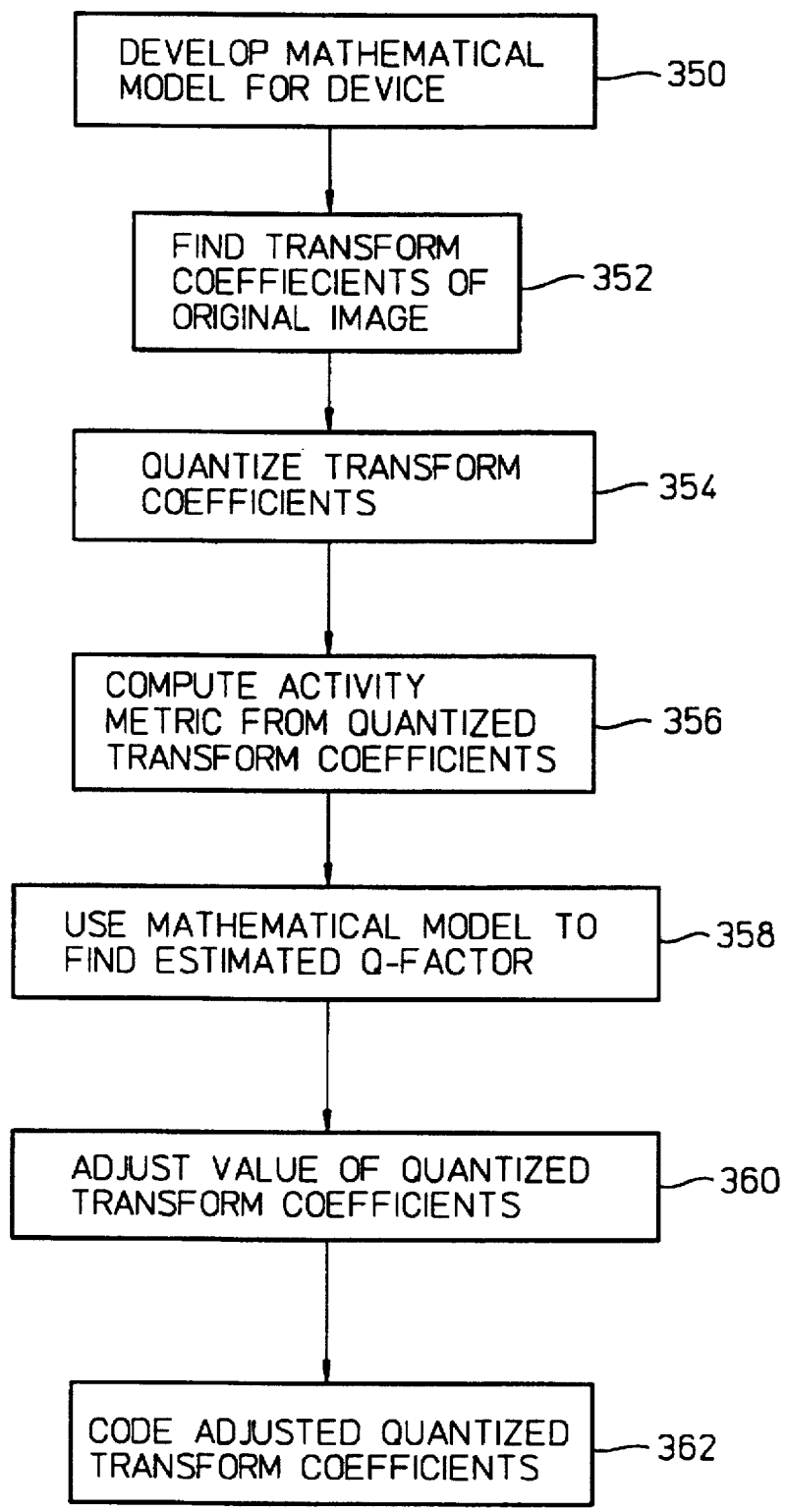
FIG. 3B is a flowchart of the steps corresponding to FIG. 3A for the implementation of the two-pass JPEG approach corresponding to the first embodiment.

FIG. 3A is a block diagram of a two-pass JPEG Compliant Fixed-Rate Coding system according to a first embodiment of the present invention. FIG. 3B is a flowchart of the steps corresponding to FIG. 3A for the implementation of the two-pass JPEG approach corresponding to the first embodiment. The first embodiment should be used when memory is not critical and a reduction in computational complexity is desired. In the first embodiment, the original image is compressed according to the steps of: orthogonally transforming said block of pixels into a set of signal representing transform coefficients 352; quantizing the transform coefficients 354, using a fixed quantization table Q-table and a predetermined initial Q-factor, into quantized transform coefficients; computing the activity metric 356 using the quantized transform coefficients; using the mathematical model defining the relationship for test images between the activity metric and the initial Q-factor to determine an estimated Q-factor $Q_{new}$ 358; adjusting the value of the quantized transform coefficients using the initial Q-factor and the estimated Q-factor 360; and coding the signal representing the adjusted quantized transform coefficients 362.

Referring to FIG. 3A shows a block diagram of the JPEG compliant fixed-rate coding system according to the first embodiment of the present invention. In the first embodiment, the original image is read 308 and compressed using a modified JPEG algorithm. The original image 308 is preferably divided into blocks, typically 8×8 blocks of pixels, before the step 312 of orthogonally transforming the block of pixels. During the first pass 310, the input image 308 is orthogonally transformed using a Discrete Cosine Transform (DCT) 312 and quantized using a fine quantization step 314. Although orthogonal transformation using a DCT is preferred, other means of orthogonal transforming the image may be used. For example, Karhumen-Loeve Transforms (KLT) or Walsh-Hadamard Transforms (WHT) may be used.

The transform coefficients are quantized using a fixed quantization table Q-table having entries $Q_{ij}$ and a predetermined initial Q-factor $Q_{init}$. The predetermined Q-factor, $Q_{init}$ is such that it results in distortion of the image that is typically imperceptible while we calculate its activity A.

Compared to conventional JPEG processing shown in FIG. 1, in the first embodiment of the present invention, the VLC coding block 118 is eliminated during the first pass. During the first pass of conventional JPEG processing block (see block 112 of FIG. 1) the image is orthogonally transformed using a Discrete Cosine Transform (114), quantized (116), and coded in the VLC coding block 118. In the present invention, during the first pass the input image 308 is orthogonally transformed 352 and quantized 354 resulting in a partially compressed image 315 which is stored in a buffer. The partially compressed image 315 may be mathematically represented by $\lfloor q_{ij}/[Q_{init}*Q_{ij}] \rfloor$. Where $q_{ij}$ are the nonquantized transform coefficients, $Q_{init}$ is the predetermined fixed value of the Q-factor used in the first pass, and $Q_{ij}$ is the (i,j)th entry in the Q table. Under the original Q-table and the initial Q-factor $Q_{init}$. After the orthogonal transformation and Quantization steps 352, 354, the activity metric is computed 346 from the quantized coefficients and from the activity metric a new estimated Q-factor $Q_{new}$ 318 is found.

The second pass is a partial JPEG step where the already quantized coefficients are adjusted using the initial Q-factor value and the estimated Q-factor and then entropy coded. This new value of the estimated Q-factor used during the second pass is automatically given by the off-line calculated mathematical model (Equation 1) using as input the value of the image activity (Equation 2) calculated during the first pass 310. In the second pass, the quantized coefficients are adjusted by multiplying them by the ratio of the initial Q-factor $Q_{init}$ divided by the newly estimated Q-factor $Q_{new}$ which is dependent on the activity metric. The resulting adjusted quantized transform coefficients 323 may be mathematically represented by $$\lfloor \frac{q_{ij}}{Q_{init}*Q_{ij}} \rfloor * \left( \frac{Q_{init}}{Q_{New}} \right)$$

The adjusted coefficients 323 are processed under the original Q-table and the new estimated Q-factor $Q_{new}$. Because, $$\lfloor \frac{q_{ij}}{Q_{init}*Q_{ij}} \rfloor \left( \frac{Q_{init}}{Q_{New}} \right) \cong \lfloor \frac{q_{ij}}{Q_{New}*Q_{ij}} \rfloor$$

which is approximately equal to the quantized coefficient under the estimated Q-factor $Q_{new}$. In order to get a JPEG compressed image all that needs to be done is the VLC coding. Thus, the adjusted quantized transform coefficients 323 are then coded by the VLC processing block 324 resulting in a final compressed image 330 which is fully JPEG compliant.

Compared to the second pass of the conventional JPEG processing (FIG. 1), the first embodiment of the present invention (FIG. 3) eliminates entropy coding and the inverse DCT steps that a typical two pass rate-control scheme would require. The complexity of our scheme is approximately 1.5 times that of a standard JPEG compression scheme without rate-control.

Figure 4A:
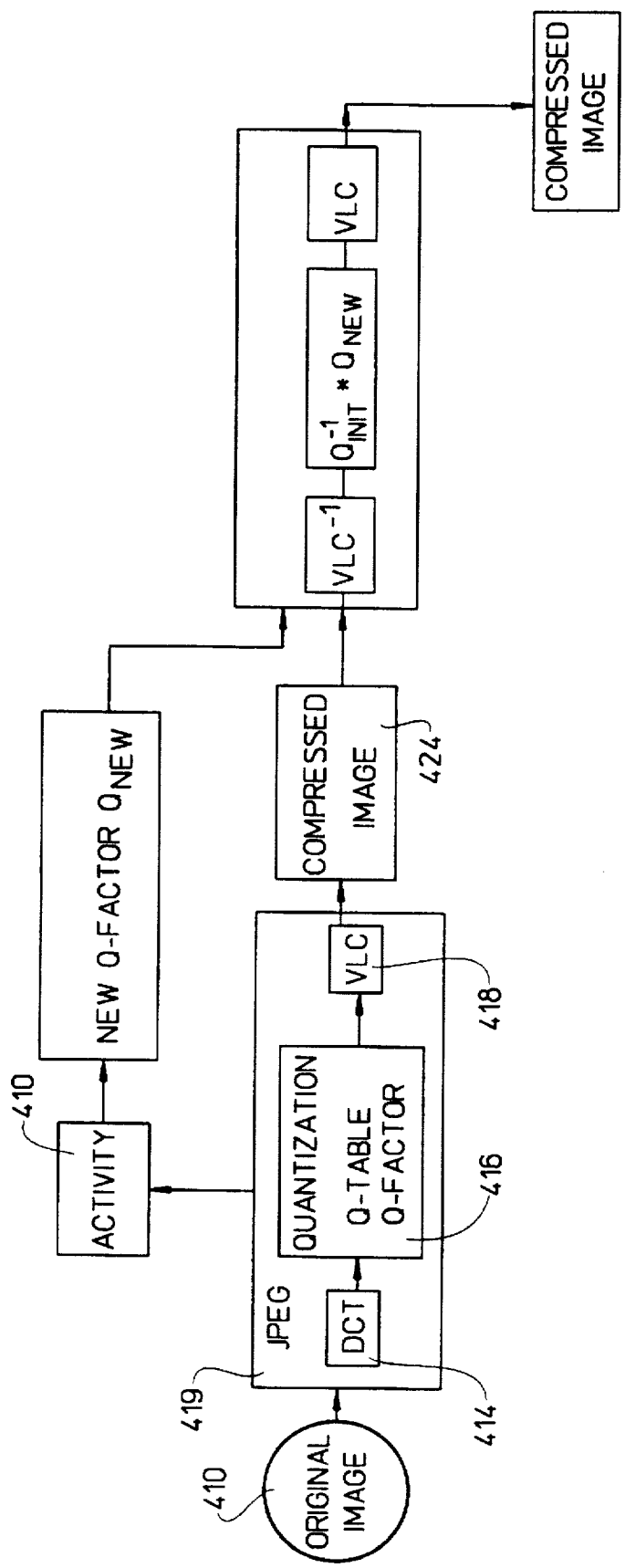
FIG. 4A is a block diagram of a two-pass JPEG Compliant Fixed-Rate Coding system according to a second embodiment of the present invention.
Figure 4B:
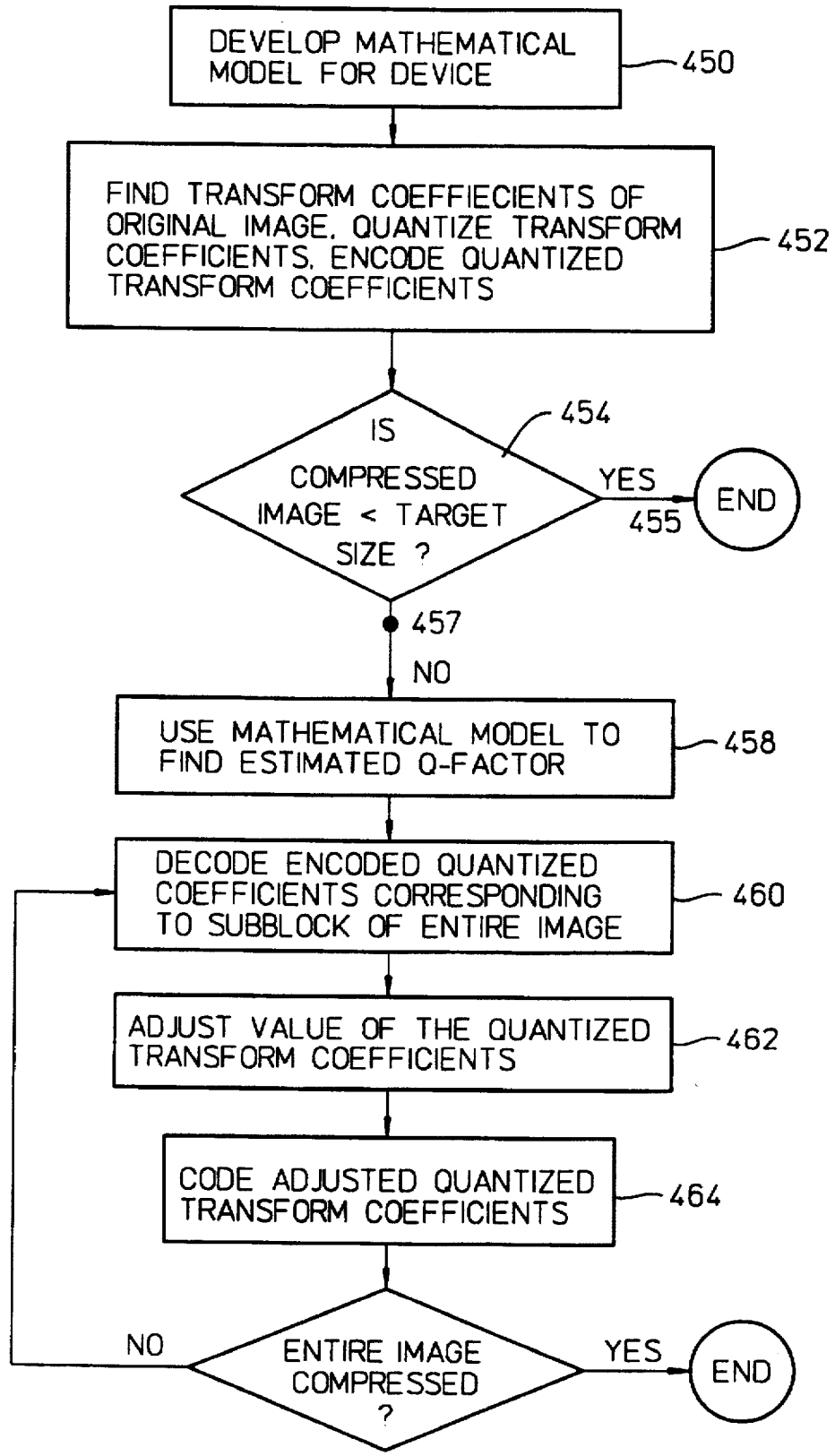
FIG. 4B is a flowchart of the steps corresponding to FIG. 4A for the implementation of the two-pass JPEG approach corresponding to the second embodiment.

FIG. 4A is a block diagram of a two-pass JPEG Compliant Fixed-Rate Coding system 400 according to a second embodiment of the present invention. FIG. 4B is a flowchart of the steps corresponding to FIG. 4A for the implementation of the two-pass JPEG approach corresponding to the second embodiment. The second embodiment should be used when memory is critical. Similar to the first embodiment, in the second embodiment processing of the original image includes the steps of: orthogonally transforming said block of pixels into a set of transform coefficients 452; quantizing the transform coefficients 452, using a fixed quantization table Q-table and a predetermined initial Q-factor, into quantized transform coefficients; computing the activity metric using the quantized transform coefficients; using the mathematical model defining the relationship for test images between the activity metric and the initial Q-factor to determine an estimated Q-factor $Q_{new}$ 458; adjusting the value of the quantized transform coefficients using the initial Q-factor and the estimated Q-factor 360; and coding the signal representing the adjusted quantized transform coefficients 362. However, in addition to these steps further included are the two VLC coding steps and an inverse VLC coding step.

Unlike the compression system 300 according to the first embodiment, a first pass 420 of the second embodiment includes all the processes of a standard JPEG processor including the DCT process 414, a Quantizing process 416, and a VLC coding process 418 resulting in an output 424 of a JPEG compressed image under $Q_{init}$. The original image 410 is processed during the first pass with the JPEG algorithm using a fine quantization step. By processing the original image 410 during the first pass, the resulting compressed image 424 can fit into a working buffer which is smaller than the original image size. During the second pass only a small portion of the DCT coefficients corresponding to a small sublock of the entire image is decoded at any time and then re-coded with the coarser quantization $Q_{new}$ in order to ensure that the temporarily decompressed image can still fit into the allocated working buffer.

For certain images, this fine compression mode using predetermined initial value $Q_{init}$ provides enough compression to meet the target ratio. After the JPEG step in the first pass 419, the output 424 can be tested to see if it meets the target ratio. If the target ratio is met 455, the second pass is not performed and the output is the JPEG compressed image with a Q-factor of $Q_{init}$. In the case where insufficient compression is achieved 457 during the first pass, the output 424 is further processed using a coarser quantization step, corresponding to the higher value of the estimated Q-factor $Q_{new}$.

During a second pass a partial JPEG algorithm is used having a coarser quantization step, corresponding to the newly estimated value of the Q-factor $Q_{new}$. The newly estimated Q-factor is provided by a mathematical model relating the activity metric to the Q-factor. During the second pass, the compressed image is processed by an inverse VLC block which returns the quantized DCT coefficient under the original Q-table and the Q-factor $Q_{init}$. Then these coefficients are adjusted by dividing by $(Q_{init}^{-1}*Q_{new})$ which results in approximately quantizing the original unquantized DCT coefficients under the original Q-table and the Q-factor $Q_{new}$. The adjusted DCT coefficients are then coded by the VLC process resulting in a final JPEG compliant compressed image.

We have tested this system on a large set of test images captured with a Kodak DCS200 camera. Our experiments have shown that this system can keep the average compression ratio achieved on this suite of test images within 10% from a target ratio. The ratios that we have experimented with are 15:1, 20:1, and 25:1.

Figure 5:
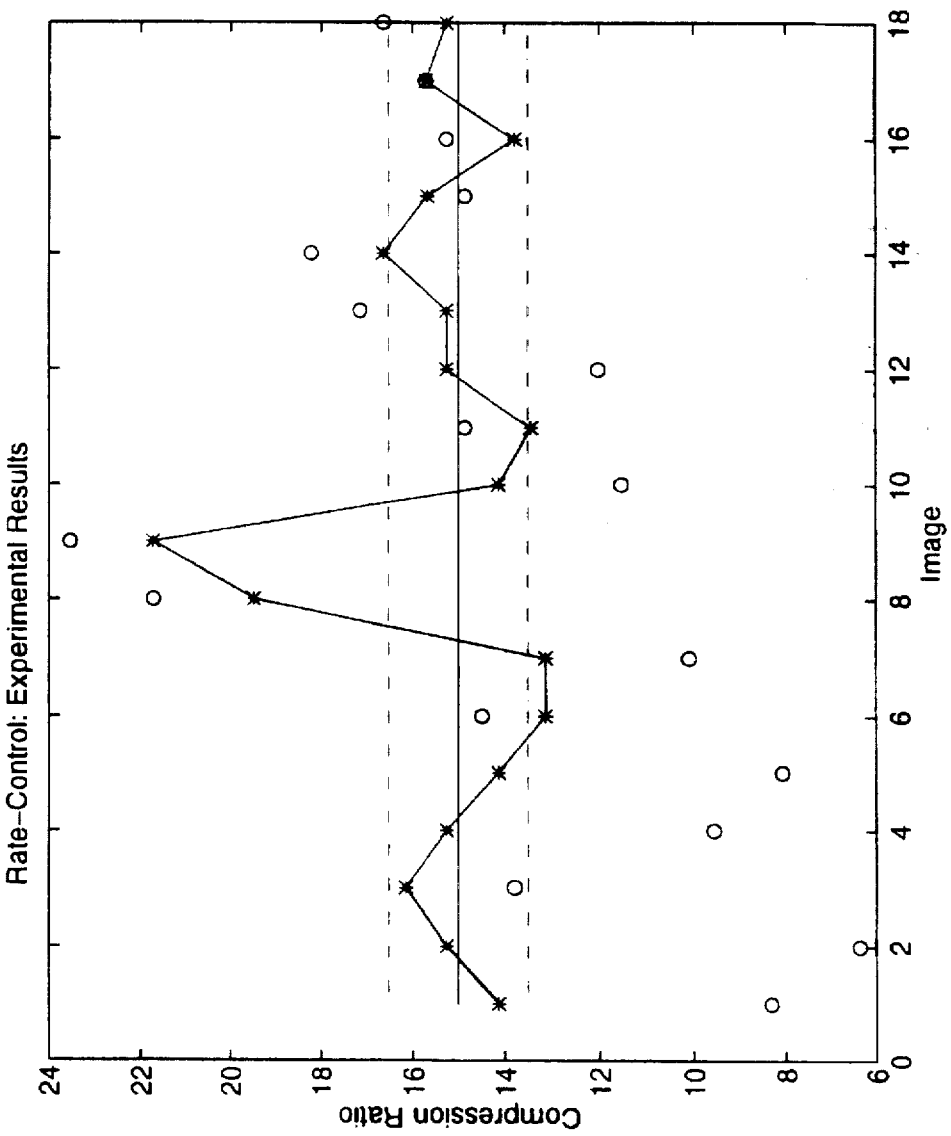
FIG. 5 is a graphical representation of the per image compression ratios achieved on the test suite according to the present invention.

The plot in FIG. 5 depicts the per image compression ratios achieved on the test suite by our scheme. For the sake of comparison, we have also plotted the compression ratios obtained on the same test suite by using JPEG with an average fixed value of the Q-factor (Q=20). Notice the large variability of the compression ratios achieved, with the fixed value of the Q-factor ranging from 6:1 to 24:1 depending on the complexity of the image input. FIG. 5 illustrates the result of processing an image by our method.

For example, a typical consumer type digital camera is expected to have 8 MB of onboard RAM, out of which about 6 MB is used for permanent storage of 24 compressed images (4.5 MB original size, compressed at a ratio of 16:1) and 2 MB is designated as a working buffer. Our experimentation has shown that using a fine Q-factor of 9 has always resulted in more than 4:1 compression, so that we can easily fit the temporary image after the first pass into the 2 MB buffer.

It is understood that the above description is intended to be illustrative and not restrictive. The scope of the invention should therefore not be determined with reference to the above description, but instead should be determined with reference to the appended claims, along with the full scope of the equivalents to which such claims are entitled.

What is claimed is:

1. A method for transforming a block of pixels from an electronic image into a compressed digital representation of said image stored in a predetermined fixed-size buffer, comprising the steps of:

for a particular image capturing device, developing a mathematical model, the mathematical model defining a relationship for test images between the activity metric and the Q-factor;

orthogonally transforming said block of pixels into transform coefficients, quantizing the transform coefficients using a fixed quantization Q-table and a predetermined initial Q-factor into quantized transform coefficients;

computing the activity metric using the quantized transform coefficients;

using the mathematical model defining the relationship for test images between the activity metric and the initial Q-factor to determine an estimated Q-factor; and adjusting the value of the quantized transform coefficients using the initial Q-factor and the estimated Q-factor; and coding the signal representing the adjusted quantized transform coefficients.

2. The method recited in claim 1 wherein the mathematical model is developed during the calibration phase, before the step of orthogonally transforming the block of pixels into transform coefficients.

3. The method recited in claim 1 wherein the mathematical model defining a relationship between the activity metric and the Q-factor is a second degree polynomial curve for a portion of the test images.

4. The method recited in claim 1 wherein the mathematical model for finding Q is set equal to $Q_{min}$ for values less than or equal than $Q_{min}$.

5. The method recited in claim 1 wherein the activity metric A is equal to the average sum of the absolute value of the quantized DCT coefficients per block and for an image divided into 8×8 blocks is given by $$A = 1/N_B \sum_{N_B} \sum_{i=1}^{8} \sum_{j=1}^{8} \lfloor \frac{q_{ij}}{Q_{init} * Q_{New}} \rfloor$$

where $N_B$ is the number of 8×8 blocks in the original image, $Q_{init}$ is the Q-factor value used during the first pass for all images, $q_{ij}$ are the quantized DCT coefficients, and $Q_{ij}$ is the (i,j)th entry in the Q-Table.

6. The method recited in claim 1 wherein the block of pixels is orthogonaly tranformed using the DCT algorithm.

* * * * *